(12) United States Patent
Alzaga et al.

(10) Patent No.: US 12,433,713 B2
(45) Date of Patent: Oct. 7, 2025

(54) GUIDING A NEEDLE USING A RADIOPAQUE CONTOUR

(71) Applicant: Siemens Healthcare GmbH, Erlangen (DE)

(72) Inventors: Amilcar Alzaga, Nuremberg (DE); Alois Regensburger, Erlangen (DE)

(73) Assignee: Siemens Healthineers AG, Forchheim (DE)

( * ) Notice: Subject to any disclaimer, the term of this patent is extended or adjusted under 35 U.S.C. 154(b) by 548 days.

(21) Appl. No.: 16/840,434

(22) Filed: Apr. 5, 2020

(65) Prior Publication Data

US 2020/0315736 A1    Oct. 8, 2020

(30) Foreign Application Priority Data

Apr. 5, 2019    (DE) .......................... 102019204920.6

(51) Int. Cl.
| | |
|---|---|
| *A61B 90/00* | (2016.01) |
| *A61B 6/12* | (2006.01) |
| *A61B 17/00* | (2006.01) |
| *A61B 17/34* | (2006.01) |
| *A61B 34/20* | (2016.01) |

(52) U.S. Cl.
CPC ................ *A61B 90/39* (2016.02); *A61B 6/12* (2013.01); *A61B 17/3403* (2013.01); *A61B 34/20* (2016.02); *A61B 2017/00477* (2013.01); *A61B 2034/2065* (2016.02); *A61B 2090/3966* (2016.02); *A61B 2090/3983* (2016.02)

(58) Field of Classification Search
None
See application file for complete search history.

(56) References Cited

U.S. PATENT DOCUMENTS

| | | | |
|---|---|---|---|
| 4,485,815 A | 12/1984 | Amplatz et al. | |
| 6,689,142 B1 * | 2/2004 | Tremaglio, Jr. | ... A61B 17/3496 604/114 |
| 10,828,110 B1 * | 11/2020 | Merette | ................. A61B 90/37 |

(Continued)

FOREIGN PATENT DOCUMENTS

| | | |
|---|---|---|
| CN | 101268967 A | 9/2008 |
| CN | 101849848 A | 10/2010 |

(Continued)

OTHER PUBLICATIONS

Apriomed; "Step by step description—Use of Seestar, Guiding Device and SeeGrid, Positioning Indicator"; http://apriomed.com/products/seestar/am dated Dec. 10, 2019. pp. 1-10.

(Continued)

*Primary Examiner* — Christopher Koharski
*Assistant Examiner* — Renee C Langhals
(74) *Attorney, Agent, or Firm* — Lempia Summerfield Katz LLC

(57) ABSTRACT

A guide unit for guiding a medical object such as a needle includes a locking unit, by which the guide unit may be disposed on the medical object. In order to enable a position of a medical object to be precisely determined, an aligning element that is in a fixed pose relative to the locking unit is provided. A contour that has a higher radiopacity than a remainder of the aligning element is disposed on the aligning element.

12 Claims, 4 Drawing Sheets

(56) References Cited

U.S. PATENT DOCUMENTS

| | | | |
|---|---|---|---|
| 2005/0234476 A1* | 10/2005 | Whitmore, III | A61B 17/3403 606/130 |
| 2008/0234575 A1 | 9/2008 | Klingenbeck-Regn et al. | |
| 2009/0274271 A1* | 11/2009 | Pfister | A61B 6/5229 378/65 |
| 2010/0099980 A1 | 4/2010 | Godara et al. | |
| 2010/0249525 A1 | 9/2010 | Shelton, IV | |
| 2011/0126844 A1 | 6/2011 | Cinquin et al. | |
| 2013/0267834 A1* | 10/2013 | McGee | A61M 5/427 604/272 |
| 2016/0045269 A1* | 2/2016 | Elhawary | A61B 34/20 606/130 |
| 2017/0196590 A1 | 7/2017 | Sperry et al. | |
| 2018/0228568 A1 | 8/2018 | Kato et al. | |
| 2019/0125398 A1* | 5/2019 | Baldwin | A61B 1/00147 |
| 2020/0085527 A1 | 3/2020 | Alzaga et al. | |

FOREIGN PATENT DOCUMENTS

| | | |
|---|---|---|
| CN | 108433824 A | 8/2018 |
| CN | 108463178 A | 8/2018 |
| DE | 102018215599 A1 | 3/2020 |
| GB | 2184358 A | 6/1987 |

OTHER PUBLICATIONS

German Office Action for German Application No. 10 2019 204 920.6 dated Dec. 13, 2019.

Magnusson, Anders, et al. "Computed-tomography-guided punctures using a new guidance device." Acta Radiologica 46.5 (2005): 505-509.

Regensburger, A. et al., "Improved Laser Needle Guidance", publication. 2019. pp. 1-3.

* cited by examiner

FIG 2
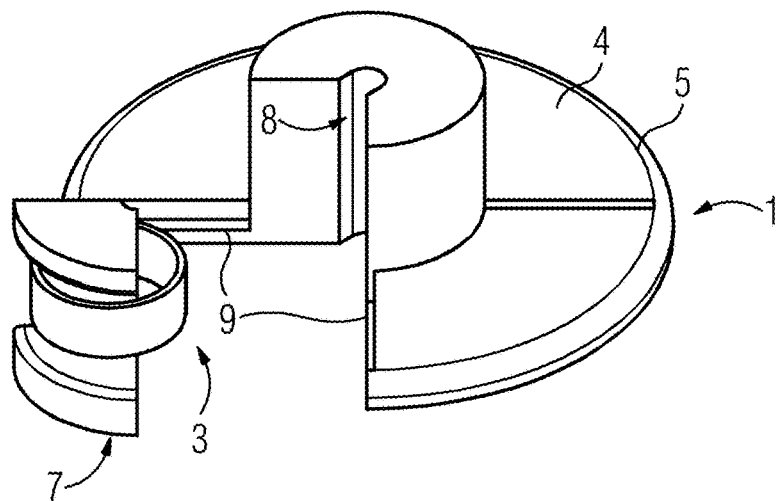
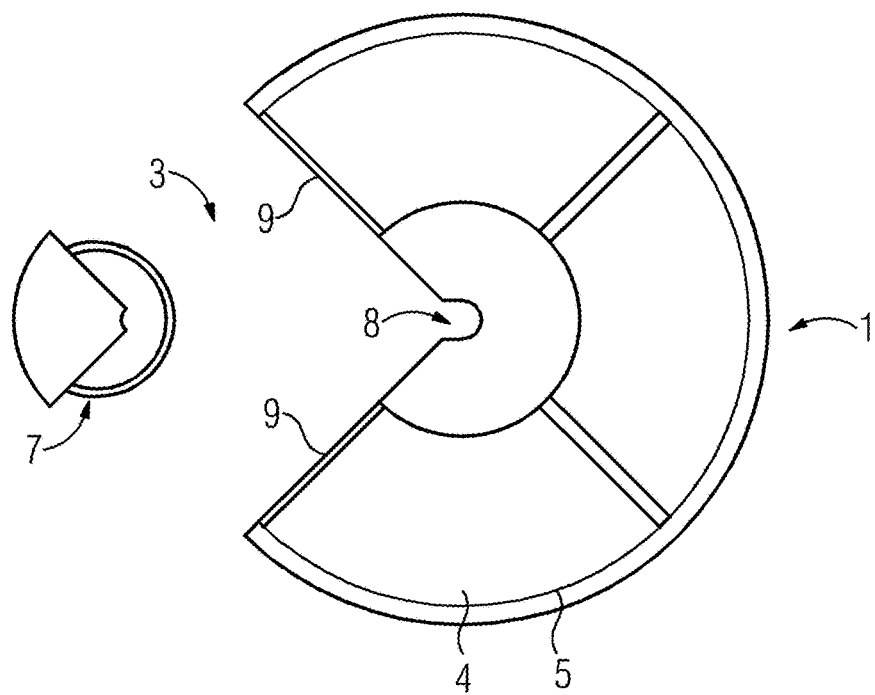
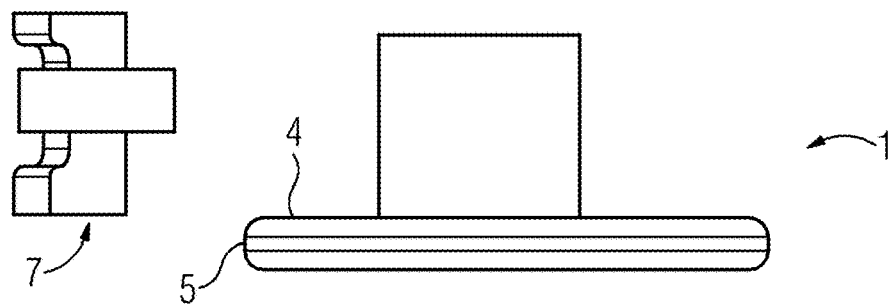

GUIDING A NEEDLE USING A RADIOPAQUE CONTOUR

This application claims the benefit of German Patent Application No. DE 10 2019 204 920.6, filed on Apr. 5, 2019, which is hereby incorporated by reference in its entirety.

BACKGROUND

The present embodiments relate to guiding a medical object.

In many cases, it is necessary to align medical objects (e.g., a needle) very accurately relative to a medical target object. Such a medical target object may be, for example, a patient or simulator, also known as a dummy, for simulating the patient. The medical object (e.g., the needle) may typically be inserted into the medical target object. Particularly in the case of a needle, the needle is to follow a pre-planned path or trajectory during this procedure. For example, such a path/trajectory may be planned in advance based on information about the medical target object. Such information may include, for example, an ultrasound image, an X-ray picture, a CT tomogram, or a magnetic resonance image of the medical target object. In a specific example, the needle may be guided to a target point inside the patient or dummy. However, as described above, the needle is to be guided, for example, along the predetermined path. The target point inside the patient may be a tumor, for example. In the case of a dummy, the target point may be configured to simulate such a tumor. However, precise positioning of a medical object is also necessary in many other situations. The insertion of the needle (e.g., for tumor ablation) is therefore only an example.

Guide units for guiding a needle may be connected to a C-arm X-ray device in a fixed but adjustable manner. Such a guide unit may include a needle holder that is initially aligned based on the planned path. The needle holder may reduce the movement of the needle to one degree of freedom (e.g., the degree of freedom along the planned path).

SUMMARY AND DESCRIPTION

The scope of the present invention is defined solely by the appended claims and is not affected to any degree by the statements within this summary.

The present embodiments may obviate one or more of the drawbacks or limitations in the related art. For example, a position of a medical object may be precisely determined.

A first aspect provides a guide unit for guiding a medical object (e.g., a needle). The guide unit includes a locking unit, by which the guide unit may be disposed on the medical object.

The guide unit is characterized by an aligning element that is in a fixed pose relative to the locking unit. A contour having a higher radiopacity than the rest (e.g., a remainder) of the aligning element is disposed on the aligning element. The term "pose" denotes the spatial location of the object, and therefore, the combination of position and orientation of the object in three-dimensional space or rather relative to the locking unit.

The locking unit is configured to connect the guide unit to the medical object. In other words, the guide unit is disposed on the medical object by the locking unit. For example, the locking unit is configured to temporarily create a fixed connection to the medical object. The fixed connection may be established, for example, by a form fit, force fit, or material bond. Temporary may be, for example, that the guide unit may be provisionally and reversibly disposed on the medical object using the locking unit. In other embodiments, the locking unit may alternatively be configured to produce a fixed or permanent connection to the medical object. For example, the locking unit has a receptacle for the medical object into which the medical object may be inserted for the purpose of the arrangement described above. The locking unit may alternatively or additionally have a clamping or locking mechanism. The locking unit may alternatively or additionally have a screw-type mechanism by which the locking unit may be screwed onto the medical object or the medical object may be fixed inside the receptacle. In advantageous embodiments, the locking unit has the receptacle as well as a mechanism by which the medical object may be fixed inside the receptacle. In other words, the mechanism described may be configured to fix the medical object inside the receptacle.

For example, the guide unit has a pose relative to the medical object that is unchanged (e.g., constant), while the guide unit is disposed on the medical object. In other words, the locking unit is configured to provide a fixed relative pose between the guide unit and the medical object when the guide unit is disposed on the medical object using the locking unit. In other words, the locking unit is configured to prevent relative movement between the guide unit and the medical object while the guide unit is disposed on the medical object.

The aligning element is, for example, permanently connected to the locking unit. In many embodiments, the locking unit and the aligning element are integrally interconnected.

The contour may be applied, for example, to the aligning element (e.g., in an edge region of the aligning element). For example, the aligning element is coated with the contour in some areas. The contour may alternatively or additionally be disposed in the edge region of the aligning element. For example, the aligning element is configured such that the aligning element runs at least essentially perpendicular to a main extension direction of the medical object when the guide unit is correctly disposed on the medical object by the locking unit. For example, the aligning element is aligned perpendicular to a main extension direction of the optional receptacle of the locking unit. The receptacle allows the medical object to be inserted in the receptacle along the main extension direction of the receptacle. In a further embodiment, the contour may be disposed in a plane perpendicular to the main extension direction of the receptacle. The plane in which the contour runs may alternatively or additionally run perpendicular to the main extension direction of the medical object when the guide unit is correctly disposed on the medical object.

The present embodiments are based on the idea of enabling the position and/or pose of the medical object to be determined by the radiopaque contour of the aligning element during a fluoroscopy procedure. Because of the higher radiopacity of the contour compared to the rest of the aligning element, this contour is particularly clearly visible on radiographs obtained in the course of such a fluoroscopy procedure. Because of the known and defined shaping of the contour, it is possible to infer the position or pose of the medical object from the image of the contour in the X-ray pictures when the guide unit is correctly disposed on the medical object.

According to a further development, it the aligning element is at least essentially implemented in the form of a disk or disk sector. In other words, the aligning element is at least essentially or completely disk- or disk-sector-shaped. When the guide unit is correctly disposed on the medical object, the medical object runs, for example, centrally through the disk or through the center of the circle underlying the disk sector. This may be achieved, for example, by disposing the locking unit in the center of the disk or circle underlying the disk sector.

According to a further development, the aligning element is disposed at least essentially perpendicular to the medical object when the guide unit is disposed on the medical object. For example, the aligning element is aligned at least essentially perpendicular to the receptacle of the locking unit, where the receptacle is configured to at least partially accommodate the medical object when the guide unit is correctly disposed on the medical object. This provides, for example, that the aligning element runs perpendicular to the main extension direction of the medical object when the guide unit is correctly disposed on the medical object. If the medical object is a needle, the main extension direction of the medical object may correspond to a longitudinal direction of the needle. As a result, the guide unit provides a way of detecting the position of the medical object.

According to a further development, the contour is at least partially circular-arc-shaped. In other words, the contour has, at least in sections, the shape of a circular arc or circle. For example, the contour may be altogether annular. A contour shaped in this way enables the position of the medical object to be determined in an advantageous manner.

According to a further development, the contour is circular-arc-shaped in a first region and is shaped according to one or two different radii of the circular arc in a second region. For example, the contour may be self-contained. This provides, for example, that the contour has no end. The contour may thus provide a particularly characteristic image in an X-ray picture.

According to a further development, it the contour is made of a metallic material. For example, such a metallic material may have a particularly high radiopacity compared to other materials. In addition, in the case of a metallic material, the contour may be produced particularly simply by coating the aligning element with the contour. For example, the contour may be produced by applying, vapor-depositing, or disposing the contour by any coating process on the aligning element.

According to a further development, it the aligning element is made at least essentially of a non-metallic material. In a further embodiment, the aligning element may be made completely of a non-metallic material apart from the contour. For example, the guide unit may be made of plastic, fiber composite, or suitable cardboard material. In this way, a high contrast with respect to the contour in an X-ray picture may be provided by a particularly low radiopacity of the aligning element.

A second aspect relates to a guide system including a guide unit and an X-ray unit that is configured to acquire an image of the contour and determine a geometric quantity relating to the contour from the image. In other words, the X-ray unit is configured to extract the geometric quantity from the image of the contour. For example, the image of the contour is part of an X-ray picture that has been acquired by the X-ray unit. The X-ray unit may therefore be configured to take an X-ray picture of at least the contour, to detect the image of the contour in the X-ray picture, and determine the geometric quantity therefrom. The X-ray unit may be, for example, an X-ray device including an X-ray source and an X-ray detector. The geometric quantity relating to the contour may be, for example, the size of the image of the contour, a measure for the ellipticity or eccentricity of the image of the contour, a radius or a plurality of radii of the image of the contour, and/or any other geometric quantities of the image of the contour. The geometric quantity may alternatively or additionally describe the location of the image of the contour within the X-ray picture. This is advantageous if the contour is at least partially circular-arc-shaped or circular. Due to the relative location in space of X-ray unit and contour, the image of the contour may take the form of an ellipse. The geometric quantity accordingly characterizes, for example, the elliptical shape of the image of the contour.

According to a further development, the guide system is configured to determine, based on the geometric quantity, a position of the guide unit relative to the guide system. In general, the guide system may be configured to determine the position of the guide unit relative to the X-ray unit based on the image shape that is characterized by the geometric quantity. The guide system may be configured, for example, to determine the position of the guide unit with respect to two different spatial directions based on the position or location of the image of the contour within the X-ray picture. The two different spatial directions run, for example, parallel to a detector plane of a detector of the X-ray unit. Based on the size of the image of the contour in the X-ray picture, the guide system may determine, for example, the position of the guide unit relative to a third spatial direction. This third spatial direction is, for example, perpendicular to the two abovementioned different spatial directions. The position of the guide unit relative to the third spatial direction may correspond to a distance of the guide unit from the detector of the X-ray unit. The guide system may determine the orientation of the guide unit relative to the X-ray unit from the elliptical shape and/or alignment of the elliptical image of the contour. In this way, the guide system may be configured to determine the pose of the guide unit.

According to a further development, the guide system has a control unit (e.g., a controller) configured to control a collimator element of the X-ray unit as a function of the geometric quantity or the position of the medical object such that X-radiation of the X-ray unit is reduced in a predetermined region around the guide unit. In other words, the guide system is configured to control the collimator element depending on the geometric quantity or the position of the medical object. The collimator element is controlled, for example, such that the X-radiation is reduced in the predetermined region around the guide unit. In the predetermined region, the guide unit may have, for example, a holding device for holding the guide unit. The holding unit may be implemented, for example, as a grip. For example, the control unit is configured to control the collimator element while the geometric quantity or the position of the guide unit changes, such that the X-radiation is reduced in the pre-defined region around the guide unit. For example, the predetermined region around the guide unit is disposed in a predetermined position relative to the guide unit. In other words, the control unit is configured to provide that movement of the guide unit is accompanied by collimation by the collimator element. In this way, the X-radiation is reduced in the predefined region (e.g., at the grip). The collimator element may, for example, be implemented as a collimator or diaphragm. In this way, the radiation dose may be reduced for a user of the guide system (e.g., an attending physician).

According to a further development, the guide system is configured to determine a relative position between the guide unit and the medical object and, based on this relative position, to determine a position of the medical object relative to a fixed point of the guide system. For example, the relative position between the guide unit and the medical object may be stored in a database for different medical objects for when the guide unit is correctly disposed on the corresponding medical object. The guide system may then be configured to retrieve the relative position from the database. The guide system may be, alternatively or additionally, configured to determine the relative position from a user input by a user (e.g., the attending physician). The position of the medical object relative to the guide system may then be output by the guide system and/or provided at an interface. Alternatively, the guide system may be configured to output instructions according to the position of the medical object relative to the guide system and an additionally received predetermined path for the medical object (e.g., the needle). The instructions may, for example, indicate the correct positioning of the medical object relative to the predetermined path or include divergences between positions of the medical object and the predetermined path. The guide system may be configured, for example, to receive the predetermined path via a data interface and/or via user input by the user (e.g., the attending physician).

Another aspect relates to an installation including a guide system according to the present embodiments and a patient support on which a medical target object may be disposed. The X-ray unit is mounted in a correct relative position on the patient support. The guide system is configured to determine a position of the medical object relative to the patient support or the medical target object based on the geometric quantity and the correct relative position. The patient support may be, for example, a gurney or an operating table. In other words, the patient support is configured to support the medical target object. The medical target object may be, for example, a patient or a dummy. The X-ray unit and the patient support are in the correct relative position relative to one another. Based on the known relative position between X-ray equipment and the patient support, the guide system, as part of the installation, is able to determine the position of the medical object relative to the patient support or the medical target object based on the geometric quantity or based on the position of the guide unit relative to the X-ray unit.

Another aspect relates to a method for determining a position of a medical object (e.g., a needle). The method includes disposing a guide unit on the medical object. An aligning element having a contour that has a higher radiopacity than the rest of the aligning element is disposed on the guide element. The method also includes acquiring an image of the contour using an X-ray unit, and determining a position of the medical object based on the image.

The guide unit may, for example, be disposed on the medical object at least partially using a locking unit of the guide unit. For example, the guide unit is disposed on the medical object by the locking unit after the locking unit has been placed in a particular relative position for this purpose.

The X-ray unit may, for example, take an X-ray picture. The image is acquired as part of the X-ray picture taken. For example, the X-ray picture is taken during a fluoroscopy procedure. To take the X-ray picture, X-radiation may be emitted by an X-ray source of the X-ray unit and then detected by the detector of the X-ray unit. For example, both the image of the contour and an image of a medical target object are acquired by the X-ray unit. In other words, the X-ray unit takes an X-ray picture that shows both the medical target object and the contour. Therefore, as part of the fluoroscopy procedure during which a plurality of such X-ray pictures are consecutively taken, both the medical target object and the contour are continuously recorded. The position of the medical object may, for example, be determined relative to the X-ray unit.

According to a further development, based on the image, a geometric quantity relating to the contour is first determined from the image, and the position of the medical object is determined based on the geometric quantity. In other words, the geometric quantity is first extracted from the image of the contour. The position of the medical object may then be determined based on the geometric quantity. The position may be determined based on the geometric quantity using mathematical calculations according to a three-dimensional model or by matching (e.g., using a look-up table). The determining of the geometric quantity and the determining of the position based on the geometric quantity have already been explained in the context of the guide unit and will not therefore be described again here.

Another aspect relates to a computer program product including instructions that, when executed on a computer, cause the computer to carry out the following acts: receiving, from an X-ray unit, an image of a contour that is disposed on an aligning element of a guide element and has a higher radiopacity than the rest of the aligning element; and determining a position of the medical object based on the image.

For example, the computer program may have instructions that, when executed on a computer, cause the computer, based on the image, to first determine a geometric quantity relating to the contour from the image and carry out the determining of the position of the medical object based on the geometric quantity.

For example, the computer program product may be configured to cause the computer to carry out the method according to the present embodiments when the computer program product is executed on the computer.

Another aspect relates to a computer-readable medium (e.g., a non-transitory computer-readable storage medium) on which the computer program product or, more specifically, the corresponding instructions are stored. The computer-readable medium may be, for example, an optical medium, a flash memory, a hard disk, or any other digital storage medium.

The guide unit, the guide system, and the installation are closely interlinked. For this reason, features and further developments further develop both the guide element and the guide system and installation, even if this is only described once for the sake of conciseness. Similarly, features that are described in the context of the guide unit, guide system, or installation also take further the method according to the present embodiments, and vice versa. In other words, features of the method according to the present embodiments that correspond to the respective features of the guide system, guide unit, and installation likewise form part of the present application.

BRIEF DESCRIPTION OF THE DRAWINGS

The invention will now be explained in greater detail with reference to a number of accompanying drawings. These are to be understood as being merely by way of example and are not intended to limit the invention to the embodiments shown.

FIG. 2 shows a second exemplary embodiment of a guide unit from three different perspectives;

DETAILED DESCRIPTION

Figure 1:
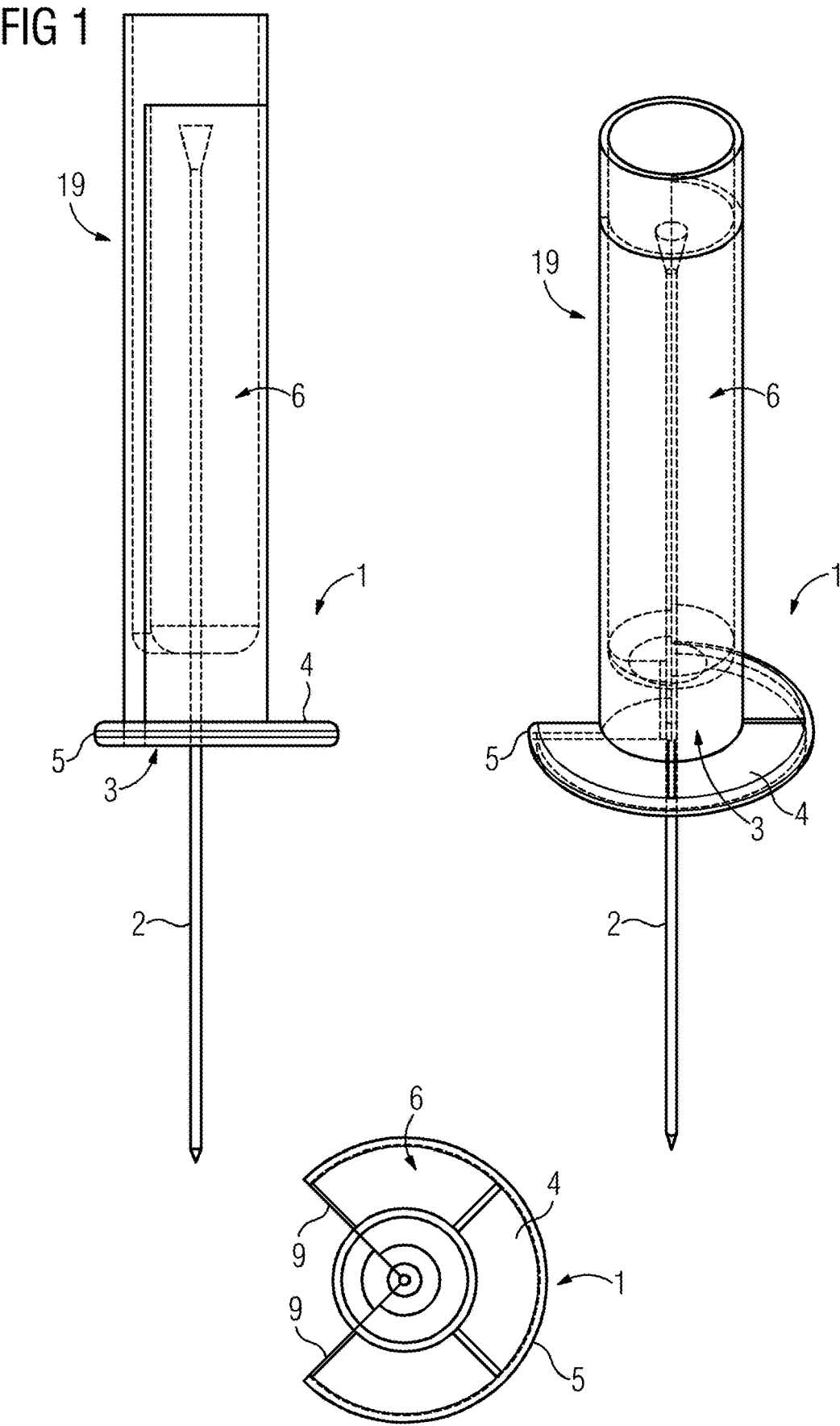
FIG. 1 shows a first exemplary embodiment of a guide unit from three different perspectives.

FIGS. 1 and 2 show different embodiments of a guide unit 1 from different perspectives in each case. In FIG. 1, the guide unit 1 is disposed on a medical object 2 (e.g., a medical needle). For disposing the guide unit 1 on the medical object 2, the guide unit 1 has a locking unit 3. According to the exemplary embodiment in FIG. 1, the locking unit 3 has a receptacle 6 enabling the medical object 2 to be inserted. In other words, the medical object 2 may be inserted in the receptacle 6 to dispose the guide unit 1 on the medical object 2. The medical object 2 is inserted, for example, parallel to a main extension direction of the receptacle 6. In this example, the receptacle 6 consists of a hollow cylinder. For example, the medical object 2 is inserted into the hollow cylinder.

In the exemplary embodiment according to FIG. 2, the locking unit 3 is configured as a clip mechanism. A first retaining contour 8 of the locking unit 3 is configured to accommodate the medical object 2. The first retaining contour 8 is configured to hold a second retaining contour 7. The second retaining contour 7 is of corresponding design to the first retaining contour 8. The two retaining contours 7 and 8 together constitute the clip mechanism. The second retaining contour 7 is configured to fix the medical object 2 in the first retaining contour 8 after the medical object 2 has been placed into the first retaining contour 8. For this purpose, the second retaining contour 7 may be connected to the first retaining contour 8 in a force- and/or form-fit manner. For example, the second retaining contour 7 may be clamped into the first retaining contour 8 so that the medical object 2 is fixed by the two retaining contours 7 and 8 in a form- and/or force-fit manner.

The locking unit 3 is configured to accommodate the medical object 2 (e.g., when the medical object 2 is a needle) parallel to a main extension direction of the receptacle 6 or the first retaining contour 8. In other words, the main extension direction of the receptacle 6 or the first retaining contour 8 runs parallel to a main extension direction of the medical object 2 when the guide unit 1 is correctly disposed on the medical object 2. The locking unit 3 may also be configured to stabilize the medical object 2. In other words, the locking unit 3 may reduce bending of the medical object 2 (e.g., if the medical object 2 is a needle). This applies, for example, to a receptacle 6, as shown in FIG. 1. This enables a user (e.g., the attending physician) to hold the medical object 2 or the guide unit 1 at a distal end while guiding the medical object 2. In other words, the attending physician may hold the guide unit 1 or the medical object 2 particularly far to the outside (e.g., well away from a medical target object 17). For example, this enables the radiation exposure to be reduced (e.g., in the case of fluoroscopy).

The guide unit 1 has an aligning element 4 having a contour 5. For example, the aligning element 4 runs at least essentially perpendicular to the main extension direction of the receptacle 6 or the first retaining contour 8. In these exemplary embodiments, the aligning element 4 is essentially disk-sector-shaped. The disk sector occupies approximately three-quarters of a full disk in the embodiments shown by way of example.

A contour 5 is disposed on the aligning element 4. The contour 5 may optionally be regarded as part of the aligning element 4 or as a discrete part of the guide unit 1. The contour 5 is made of a material that has a higher radiopacity than a material constituting the aligning element 4. The contour 5 therefore has a higher radiopacity than the aligning element 4. For example, the contour 5 is made of a metallic material. The aligning element 4 or the rest (e.g., a remainder) of the aligning element 4 apart from the contour 5 is made of a non-metallic material. For example, the guide unit 4 may be made of plastic, fiber composite material, or any other materials having comparatively low radiopacity. The contour may optionally extend over one or both radii 9 delimiting the disk sector according to which the aligning element 4 is formed. In other words, the contour may also be disposed on the radius or radii 9.

Figure 3:
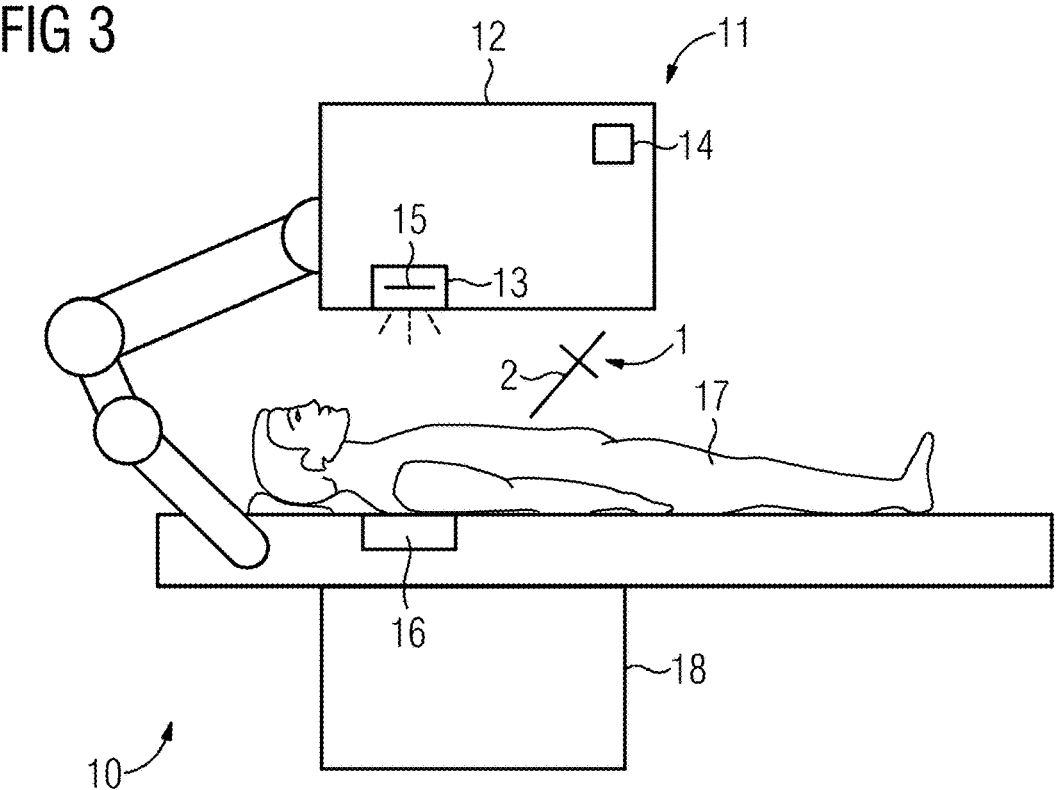
FIG. 3 shows an example of an installation including a guide system in a highly schematic side view.
Figure 4:
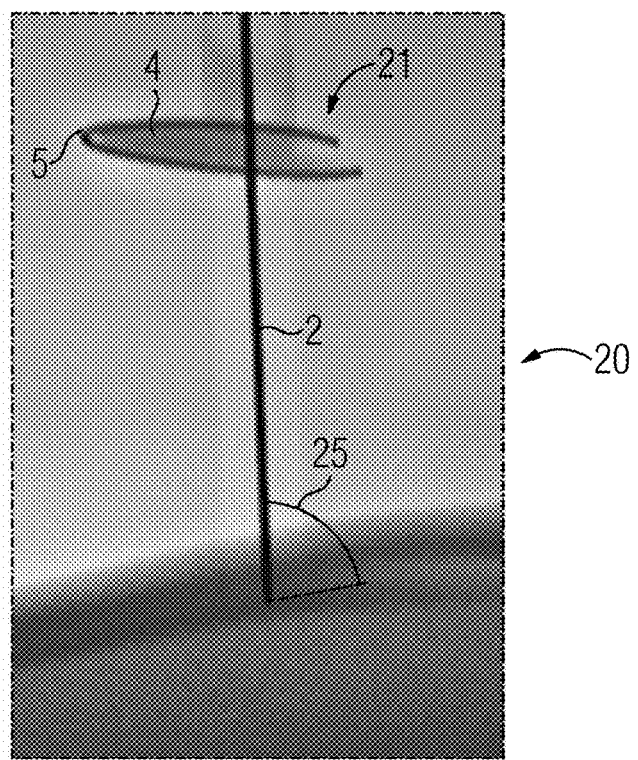
FIG. 4 shows an exemplary image of a guide unit and a needle in a schematic X-ray picture.

FIG. 3 shows an installation 10 including a guide system 11 and a patient support 18. The patient support 18 may be, for example, a bed or an operating table. The patient support 18 is configured to accommodate a medical target object 17. For example, the medical target object 17 is disposed on the patient support 18. The guide system 11 includes the guide unit 1 and an X-ray unit 12. The X-ray unit 12 may be configured as an X-ray device including an X-ray source 13 and an X-ray detector 16. For example, the X-ray unit 12 can be configured as a C-arm X-ray device (not shown in FIG. 3). The X-ray unit 12 can alternatively or additionally have a collimator element 15 (e.g., a diaphragm) and/or a control unit 14 (e.g., a microcontroller or a processor).

The guide system 11 is configured to determine a position of the guide unit 1. For example, the guide system 11 is configured to determine a position of the guide unit 1 relative to the X-ray unit 12, the patient support 18, and/or the medical target object 17. This takes place based on an X-ray picture 20 or radiograph of the guide unit 1. An image 21 of the contour 5 is, for example, acquired as part of the X-ray picture 20. Based on the contour 5 or rather the image of the contour 5, the guide system 11 is configured to determine one or more of the abovementioned positions. This will be explained below in greater detail with reference to FIG. 5. For example, the X-ray unit 12 has, for this purpose, a predetermined position relative to the patient support 18. The medical target object 17 may alternatively or additionally have a predetermined position relative to the patient support 18. The position of the guide unit 1 relative to the medical target object 17 may therefore be determined on the assumption of the predetermined relative position between the medical target object 17 and patient support 18. The position of the medical object 2 relative to the medical target object 17 and/or the patient support 18 may be determined from the position of the guide unit 1 relative to the medical target object 17 and/or the patient support 18. For example, a predetermined relative position between guide unit 1 and medical object 2 may be assumed for this purpose. Alternatively, the relative position between the guide unit 1 and the medical object 2 may be determined from a database containing corresponding values for different medical objects 2, or from a user input (e.g., by an attending physician).

A predefined region 19 around the guide unit 1 may be shielded from the X-radiation of the X-ray source 13 by the collimator element 15. In other words, the X-radiation of the X-ray source 13 in the predefined region 19 is reduced by the collimator element 15 compared to other regions in the coverage of the X-ray unit 12. For example, the collimator element 15 is configured to screen out the X-radiation for this purpose. The screening out of the X-radiation is controlled by the control unit 14. In other words, the control unit 14 is configured to control the collimator element 15. The collimator element 15 is controlled, for example, as a function of the position of the guide unit 1 relative to the X-ray unit 12. In this way, the predetermined region 19 is constantly shielded by the collimator element 15 even if the guide unit 1 moves. For example, the predetermined region 19 is configured as an area for gripping the guide unit 1. In other words, a user (e.g., the attending physician) may hold the guide unit 1 in the region 19. The shielding of the region 19 therefore enables the radiation exposure for the user to be reduced (e.g., for the attending physician).

Figure 5:
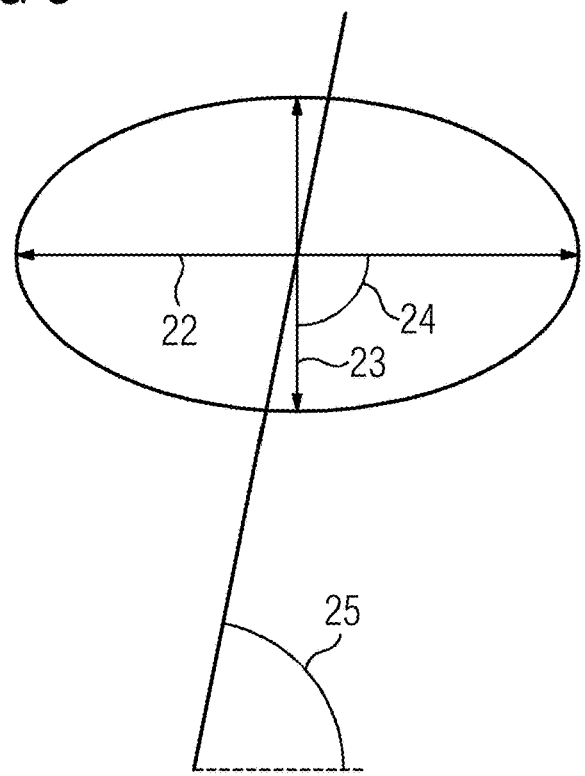
FIG. 5 schematically illustrates an exemplary determining of a position of the guide unit.
Figure 6:
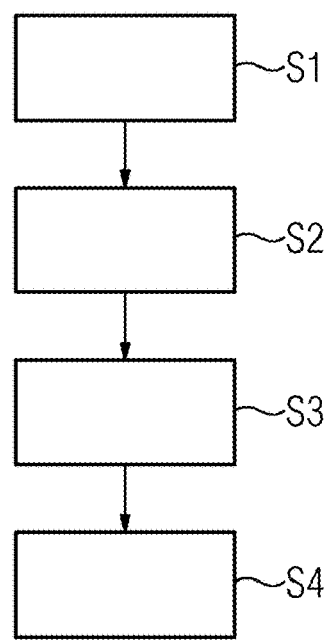
FIG. 6 shows a flowchart of one example of a method.

For example, the guide system 11 is configured to determine, from the image 21, one or more geometric quantities relating to the contour 5. A plurality of typical geometric quantities are shown in FIG. 5. For example, the extent of the image 21 with respect to one, two, or more spatial directions 22, 23 may be determined as a geometric quantity. Ellipticity or eccentricity of the contour 5 distorted elliptically in the image 21 may be determined as a geometric quantity from the extent of the image with respect to two spatial directions 22, 23. In addition, the orientation of the guide unit 1 may be determined based on an angle 24 that relates to the location of a missing portion of the circular disk of the aligning element 4. The missing portion of the circular disk denotes, for example, the region that the aligning element 4 is lacking with respect to a complete disk. An angle 25 taken up by the medical object 2 relative to a vertical axis may also be determined as a geometric quantity.

The one or more geometric quantities may be geometrically evaluated, for example. In the case of radially emitted X-rays, a distance of the guide unit 1 from the X-ray detector 16 may be determined, for example, based on the extent of the image with respect to two different spatial directions. The orientation of the guide unit 1 may be determined based on the eccentricity or the ratio of the extent of the image 21 with respect to the two different spatial directions 22, 23. Altogether, the position, orientation, and/or pose of the guide unit 1 and therefore of the medical object 2 relative to the X-ray unit 12 may be determined by the geometric quantity or the plurality of geometric quantities. The position, orientation, and/or pose of the guide unit 1 and therefore of the medical object 2 relative to the patient support 18 and the medical target object 17 may also be determined.

FIG. 5 shows an example of a flowchart of a method for determining a position of the medical object 2 (e.g., a needle). The method includes act S1, in which a guide unit is disposed on the medical object; there is an aligning element having a contour that has a higher radiopacity than the rest (e.g., a remainder) of the aligning element disposed on the guide element. In act S2, an image of the contour is acquired using an X-ray unit, and in acts S3 and S4, a position of the medical object is determined based on the image.

In act S3, based on the image 21, a geometric quantity relating to the contour 5 is first determined from the image 21. Then, in act S4, the position of the medical object 2 is determined based on the geometric quantity.

In another embodiment, based on a position of the medical object determined using this method, the three-dimensional position of the medical object 2 in previously acquired three-dimensional views of the medical target object 17 may also be displayed. For example, an image of the medical object 2 in the currently determined three-dimensional position is placed over the previously acquired three-dimensional views of the medical target object 17. This may take place, for example, using image overlays. For example, the position of the medical object 2 is transmitted by the guide system 11 to a display device (e.g., a screen or projector), on the which the previously acquired three-dimensional view is shown. By the display device, a common representation in which the image of the medical object 2 is superimposed on the previously acquired three-dimensional view in the corresponding relative position to the medical target object 17 may then be produced. The previously acquired three-dimensional view is, for example, a three-dimensional radiograph or a CT tomogram.

The superimposing described is advantageous if a plurality of medical objects 2 (e.g., needles) are to be inserted. For example, a three-dimensional view of the medical target object 17 is first created. A trajectory for a first needle is then determined based on the three-dimensional view. After the needle 2, for example, has been inserted, the correct location of the needle 2 is to be verified. For this purpose, a new three-dimensional view would normally be necessary. By determining the position of the first needle using the guide system 11 or the installation 10, a new three-dimensional view of this kind may be dispensed with. Instead, the correct location of the needle may be verified based on the position determined by the method according to the present embodiments. A trajectory for a second needle may depend on the actual trajectory along which the first needle was actually introduced. In this case, a new three-dimensional view would likewise be necessary. By determining the position of the first needle using the guide system 11 or the installation 10, the trajectory for the second needle may be determined based on the position determined by the method according to the present embodiments. Similarly, the correct location of the second needle may also be verified by the guide system 11 by determining the position of the second needle.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A guide system comprising:
  a guide unit for guiding a medical object during a medical procedure, the guide unit comprising:
    a locking unit, by which the guide unit is disposable on the medical object; and
    an aligning element that is in a fixed pose relative to the locking unit, wherein a contour disposed on the aligning element has a higher radiopacity than a remainder of the aligning element, wherein at least a portion of the aligning element is disk-sector-shaped, wherein at least a portion of the contour is circular-arc-shaped; and an X-ray unit that is configured to:
  acquire an image of the contour; and
  determine a geometric quantity relating to the contour from the acquired image, wherein the geometric quantity includes a radius or a plurality of radii of the image of the contour,
wherein the guide system is configured to determine, throughout the medical procedure, a three-dimensional position and orientation of the guide unit and the medical object relative to the X-ray unit, including a distance of the guide unit from the X-ray unit, based on the determined geometric quantity, and
wherein the guide system is configured to guide the medical object or control the X-ray unit during the medical procedure based on at least the distance of the guide unit from the X-ray unit.

2. The guide system of claim 1, further comprising a controller configured to:
  control a collimator element of the X-ray unit as a function of the determined geometric quantity or the determined position of the guide unit such that X-radiation of the X-ray unit is reduced in a predetermined region around the guide unit.

3. The guide system of claim 1, wherein the guide system is configured to:
  determine a relative position between the guide unit and the medical object; and
  based on the determined relative position, determine a position of the medical object relative to a fixed point on the guide system.

4. The guide system of claim 1, wherein the medical object comprises a needle.

5. The guide system of claim 1, wherein the guide unit is shaped such that the aligning element is disposed substantially perpendicular to the medical object when the guide unit is disposed on the medical object.

6. The guide system of claim 1, wherein the contour is circular-arc-shaped in a first region and shaped according to one or more different portions of radii of the circular arc in a second region, the contour being disposed on and extending over the one or more different portions of radii of the circular arc in the second region.

7. The guide system of claim 1, wherein the contour is made of a metallic material.

8. The guide system of claim 1, wherein at least a portion of the aligning element is made of a non-metallic material.

9. The guide system of claim 1, wherein the locking unit comprises:
  a first retaining contour configured to accommodate the medical object; and
  a second retaining contour corresponding to the first retaining contour and configured to fix the medical object in the first retaining contour.

10. The guide system of claim 9, wherein the medical object is fixed by the first retaining contour and the second retaining contour in a force-fit, form-fit, or force-and form-fit manner.

11. The guide system of claim 1, wherein the disk-sector shaped portion of the aligning element is defined by a circular-arc shaped portion and two straight edge portions, such that a corresponding disk-sector-shaped gap extends between the two straight edge portions of the aligning element.

12. The guide system of claim 11, wherein the circular-arc-shaped portion of the contour corresponds to the circular-arc shaped portion of the aligning element.

* * * * *